(No Model.)
J. FLATHER.
FEED MECHANISM FOR LATHES.
No. 462,481. Patented Nov. 3, 1891.
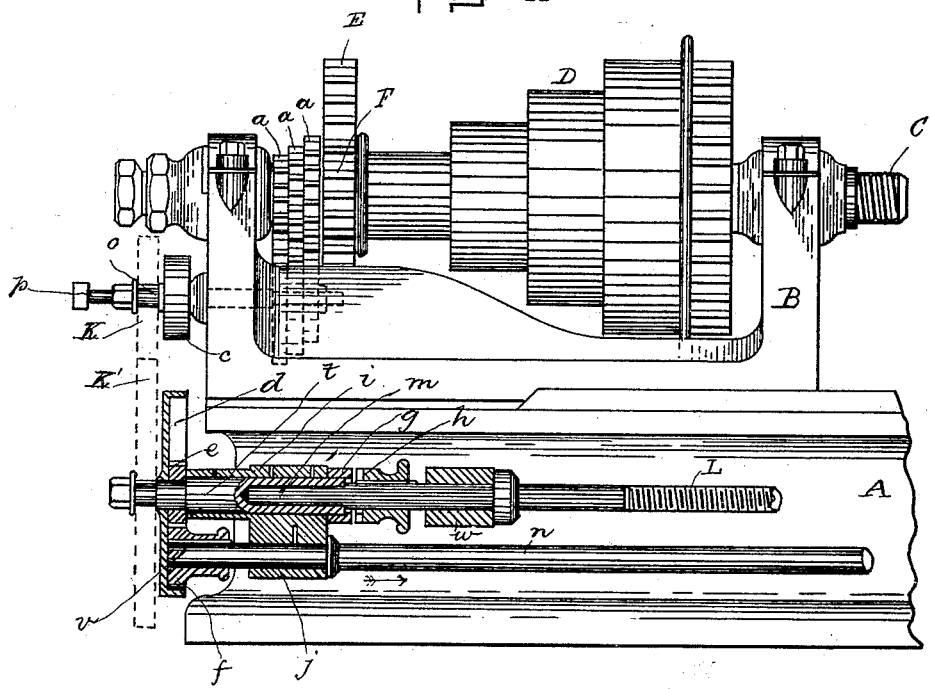
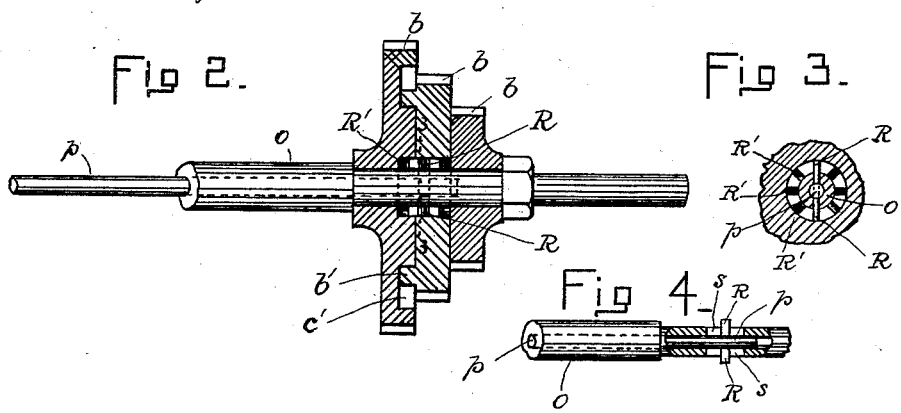
Witnesses
R. P. Elliott
Ewing W. Hamlen
Inventor
Joseph Flather
by Knight Brown Crossley
Attys.

UNITED STATES PATENT OFFICE.

JOSEPH FLATHER, OF NASHUA, NEW HAMPSHIRE.

FEED MECHANISM FOR LATHES.

SPECIFICATION forming part of Letters Patent No. 462,481, dated November 3, 1891.

Application filed February 26, 1891. Serial No. 382,955. (No model.)

*To all whom it may concern:*

Be it known that I, JOSEPH FLATHER, of Nashua, in the county of Hillsborough and State of New Hampshire, have invented certain new and useful Improvements in Feed Mechanism for Lathes, of which the following is a specification.

This invention has for its object to provide certain improvements in the feed and screw-cut mechanism of engine-lathes, whereby economy of construction is effected and the machine can be more quickly changed or adjusted to enable it to form different kinds of work than in lathes now in general use.

The invention consists in the improvements which I will now proceed to describe and claim.

Of the accompanying drawings, forming a part of this specification, Figure 1 represents a side elevation of a portion of a lathe-bed, a head-stock mounted thereon, and the devices constituting my improvement, some of said devices being shown in section. Fig. 2 represents a sectional view of the differential gears on the feed-stud, the latter being shown as disconnected from the head-stock. Fig. 3 represents a section on line 3 3 of Fig. 2. Fig. 4 represents a longitudinal section of a portion of the feed-stud.

The same letters of reference indicate the same parts in all the figures.

In the drawings, A represents the lathe-bed, B the head-stock, C the spindle, D the cone-pulley on the spindle, and E F the back gears, all of the usual construction and constituting no part of my invention, the smaller back gear F being attached, as usual, to the spindle, while the larger back gear E is on a laterally-movable shaft, (not shown in the drawings,) said shaft being provided with means whereby it may be moved to throw the gear E into and out of engagement with the gear F in the usual manner.

$a\ a\ a$ represent a series of three differential gears, which are affixed to the spindle C and are arranged to mesh into the corresponding series of differential gears $b\ b\ b$, which are mounted on the feed-stud $o$, each of the gears $b$ being normally loose upon said stud, but adapted to be engaged therewith by means of a movable clutch device or member on the feed-stud adapted to engage corresponding clutch members formed on the said gears $b$, the arrangement being such that either gear may be rigidly connected to the stud, the other two being at the same time loose thereon. The said movable clutch member is here shown as composed of two pins or keys R R, projecting in opposite directions from a rod $p$, which rod is movable longitudinally within the feed-stud $o$, the latter being tubular and provided within the gears $b\ b\ b$ with longitudinal slots $s\ s$, as shown in Fig. 4. Each of the gears $b$ is provided with a series of recesses R' R', each of which is formed to receive one of the projecting pins R, so that when said pins are moved into engagement with the recesses of either gear $b$ said gear is rotatively engaged with the feed-stud, the other gears remaining loose thereon. The middle gear $b$ has an annular rib or flange $b'$ on one side, bearing on one edge of an annular groove $c'$ in the next gear, the object being to give support to the middle gear in addition to that afforded by the bearing of the hub or central portion of said gear on the feed-stud.

The leading-screw is composed of two sections, one of which is the threaded portion L, having the unthreaded end or extension $m$, while the other is a tubular section $t$, adapted to receive the unthreaded extension $m$ of the portion L. Said sections $t$ and $m$ are adapted to rotate independently of each other, and are supported in bearings $i$ and $w$, attached to the bed A. The section $t$ is provided with a clutch member $g$, and the section $m$ is provided with a clutch-member $h$, which is longitudinally movable thereon and is keyed to the section $m$, so that it necessarily rotates therewith. When the clutches $g$ and $h$ are separated, as shown in Fig 1, the feed-rod is inoperative, but when the clutch $h$ is moved into engagement with the clutch $g$ the portion L of the leading-screw will be rotated by the rotation of the section $t$. To the said section $t$ is affixed a pulley $d$, which is connected by a belt with a pulley $c$, affixed to the feed-stud $o$, motion being thus imparted from the feed-stud to the section $t$ of the leading-screw.

$n$ represents the feed-rod, which rotates in a bearing $j$, affixed to the bed A, and is provided at one end with a pinion $f$, adapted to mesh with a pinion $e$, affixed to the section $t$ of the leading-screw. The pinion $f$ is secured to the feed-rod $n$ by the spline $v$, which permits the movement of the pinion longitudinally on said feed-rod, but causes it to rotate with the feed-rod. When the pinion $f$ is moved to the position shown in Fig. 1, the pinions $f$ and $e$ are engaged, so that the feed-rod is rotated by the rotation of the section $t$ of the leading-screw. An endwise movement of the pinion $f$ in the direction indicated by the arrow in Fig. 1 separates it from the pinion $e$, making the feed-rod inoperative.

From the foregoing it will be seen that the differential gears $b\ b\ b$ normally loose upon the feed-stud, and the clutch device whereby either gear is made fast upon said stud, enables the operator by a slight movement of the rod $p$ to impart any desired degree of motion from the spindle C to the feed-stud and from the latter to the leading-screw. It will also be seen that the divided leading-screw, one section of which is operatively connected with the feed-stud, and the movable clutch adapted to connect the sections of the leading-screw enable said screw to be readily and quickly made operative and inoperative. The engagement of the feed-rod with the continuously-rotating section of the leading-screw by means of the pinions $e$ and $f$ materially simplifies the construction of the machine, as will be readily seen.

Among the advantages resulting from the improved construction above described may be mentioned the following: first, economy of construction in the change-gearing, only one-third of the number of change-gears being required; second, a saving of time of the operator, as three different pitches of screw-threads can be cut at one setting of the change-gears; third, increased strength, the feed-works being stiffer than in lathes of ordinary construction, owing to the fact that in the construction of the feed mechanism the feed-pulley and change-gears are placed nearer the bearings than heretofore, thus enabling the operator to make larger cuts in finishing surfaces and to cut coarser screw-threads than heretofore; fourth, three changes of feed may be obtained without shift of belt. I would here remark, however, that I do not limit myself to the connection of the feed-stud with the divided leading-screw by means of the pulleys $c$ and $d$ and a belt connecting the same, as I may connect said parts by change-gears K K', as shown in dotted lines in Fig. 1. When the pulleys are used, I may substitute cone or step pulleys for the single pulleys here shown.

It will be observed that I obtain three different degrees of feed without changing the belt by the use of a single pulley in place of the ordinary three-step cone. The single pulley enables me to use a wider belt than heretofore.

A particularly-important advantage of my improvement is the fact that I obtain a gear or belt-feed with three degrees of feed without removing and replacing the change gears or belt. My invention is not limited, however, to the series of three differential gears $a\ b$, as the number in each series may be greater or less than three.

I claim—

1. In a metal-turning lathe, the combination of the spindle having a series of differential gears, a feed-stud having a corresponding series of normally loose differential gears meshing with the gears on the spindle, means for engaging either of said loose gears with the feed-stud, a divided or sectional leading-screw, connections between one section of said leading-screw and the feed-stud, whereby said section may be continuously rotated, and clutch members adapted to connect and disconnect the sections of the leading-screw, as set forth.

2. In a metal-turning lathe, the combination of the spindle having a series of differential gears, a feed-stud having a corresponding series of normally loose differential gears meshing with the gears on the spindle, means for engaging either of said loose gears with the feed-stud, a divided or sectional leading-screw, connections between one section of said leading-screw and the feed-stud, whereby said section may be continuously rotated, clutch members adapted to connect and disconnect the sections of the leading-screw, and a feed-rod having a longitudinally-movable pinion adapted to engage a pinion affixed to the continuously-rotating section of the leading-screw, as set forth.

In testimony whereof I have signed my name to this specification, in the presence of two subscribing witnesses, this 4th day of February, A. D. 1891.

JOSEPH FLATHER.

Witnesses:
R. P. ELLIOTT,
GEO. A. UNDERHILL.